June 7, 1927.
A. E. PROCTOR
1,631,336
BAND SAW TOOTH ROLLER
Filed Dec. 6, 1926
2 Sheets-Sheet 1
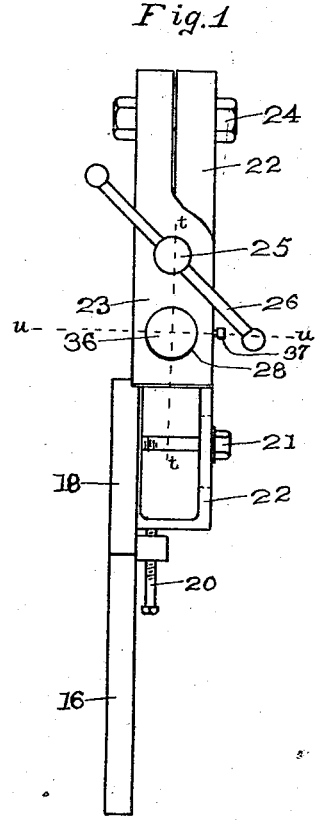
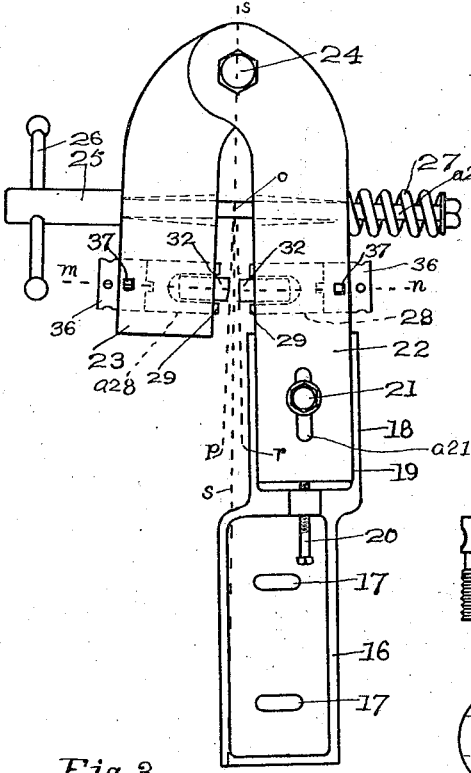
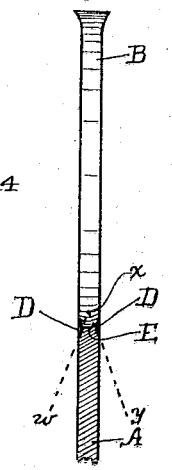
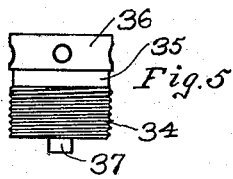
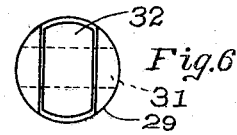
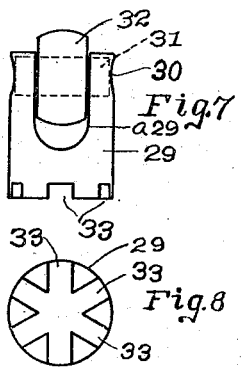
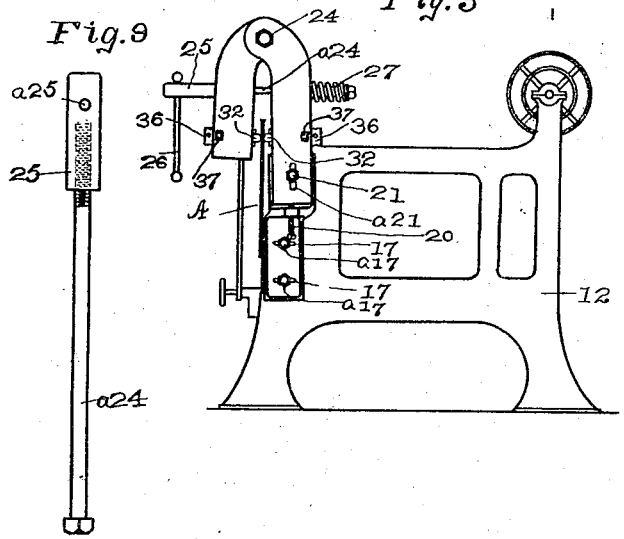
Albert E. Proctor,
INVENTOR.
BY David E. Lain,
ATTORNEY.

June 7, 1927.
A. E. PROCTOR
1,631,336
BAND SAW TOOTH ROLLER
Filed Dec. 6, 1926
2 Sheets-Sheet 2
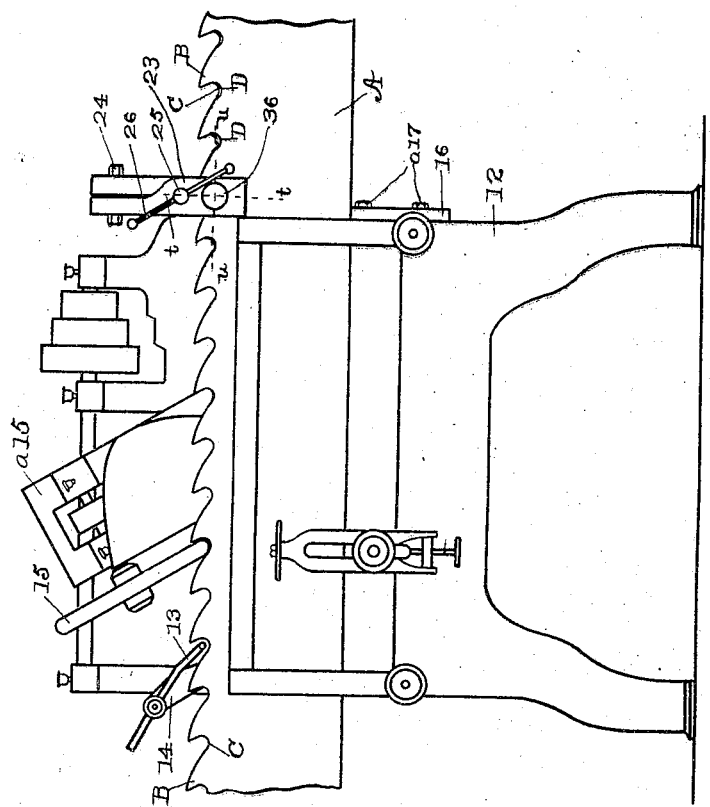
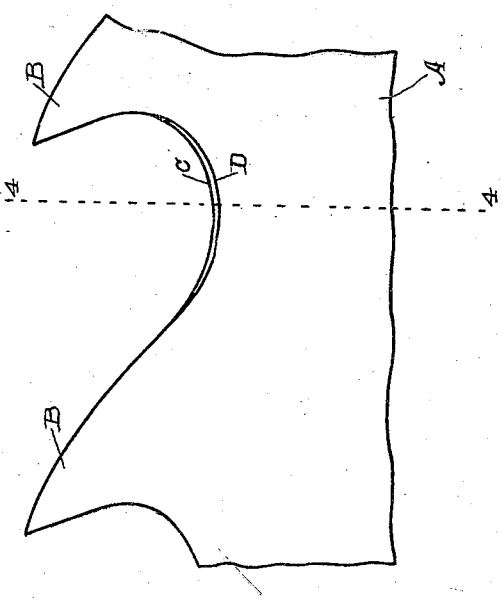
Albert E. Proctor,
INVENTOR.
BY David E. Lain,
ATTORNEY.

Patented June 7, 1927.

1,631,336

UNITED STATES PATENT OFFICE.

ALBERT E. PROCTOR, OF BELLINGHAM, WASHINGTON.

BAND-SAW-TOOTH ROLLER.

Application filed December 6, 1926. Serial No. 152,824.

My invention relates to improvements in band-saw tooth rollers, and the main object of my improvement is to provide means for compressing a bevel on the edges of the gullets of band saws. Another object of my improvement is to provide means for rolling said bevels at as large an angle of inclination to the plane of the saw as is possible. And a further object of my improvement is to provide means for rolling said bevels without scoring the saw teeth.

This invention is an improvement on the disclosures of my application for Letters Patent, Serial No. 105,934, filed May 1, 1926, which has been abandoned.

I attain these objects with the mechanism illustrated in the accompanying two sheets of drawings in which Figure 1 is a front edge elevation of my rolling device, Fig. 2 is a side elevation of Fig. 1, Fig. 3 is a rear end elevation of a band-saw grinding machine with my tooth roller fastened in operative position, showing the same view thereof as in Fig. 2, drawn on a smaller scale, Fig. 4 is a vertical cross section of a band saw on the line 4—4 of Fig. 11, drawn on a larger scale, Fig. 5 is a side elevation of a screw plug, drawn on a larger scale, Fig. 6 is an end view of a roller and its cylindrical mounting, drawn on a larger scale, Fig. 7 is a side view of Fig. 6, Fig. 8 is an end view of Fig. 7, Fig. 9 is a side view of the tension bolt and long nut thereon, drawn on a smaller scale, Fig. 10 is a front elevation of Fig. 3 drawn on a larger scale, and Fig. 11 is a side elevation of a segregated area of a band saw, most of which is broken away, drawn on a larger scale.

Similar characters refer to similar parts throughout.

Reference being had to the drawings in greater detail:

On the frame 12 of a band-saw grinding machine is mounted band saw A in position for being ground. Provision, not shown, is made on frame 12 for oscillating arm 14, connected therewith, to which is pivoted pawl 13. The action being such that at each oscillation of arm 14 pawl 13 moves saw A a distance of one tooth toward the right hand.

Also mounted on frame 12 is oscillatable grinder head $a^{15}$ on which grinder wheel 15 is mounted for revolution. Wheel 15 is shown in grinding position in a gullet and, as is well understood, the normal operation of the grinding machine causes head $a^{15}$ to oscillate and remove wheel 15 from its illustrated position at the completion of its work in each gullet, when pawl 13 operates to advance saw A a tooth space and wheel 15 is again returned to contact with a gullet.

Preferably, I provide a special casting 16, 18 for fastening my roller to the illustrated shape of saw grinding machine. The lower end 16 of this casting is provided with two horizontal slots 17 for the extension therethrough of screws $a^{17}$ with which said casting is fastened to frame 12. Slots 17 provide for transverse and inclined adjustment of said casting.

Upper end 18 of said casting is recessed at 19 for the reception of the lower end of the longer jaw 22 of my roller frame. Vertical slot $a^{21}$ is provided in the lower end of jaw 22 and through it is extended screw 21 engaged in the upper end 18 of said casting. Slot $a^{21}$ provides for vertical adjustment of said jaw. Shorter jaw 23 is hinged or pivoted to jaw 22 at 24. Screw 20 is engaged in a lug on said casting and bears against the lower end of jaw 22 for adjustment.

Jaws 22, 23 are held together and drawn together on pivot 24 by bolt $a^{24}$ extended through registering holes in said jaws 22, 23. Spiral spring 27 is mounted on one end of bolt 24 to react between the head thereof and jaw 22.

Long nut 25 has diametrical hole $a^{25}$ therethrough and is engaged on the threaded end of bolt $a^{24}$ to bear against jaw 23. Knobbed hand rod 26 is mounted in nut hole $a^{25}$ for convenience in turning said nut and operating said jaws.

Hole 28 is bored in jaw 22 at right angles with pivot 24 and hole $a^{28}$ is bored in jaw 23 to register with said hole 28 when said jaws are parallel. The outer ends of said bored holes are tapped to receive screw plugs 34 which have turret heads 36 and annular grooves 35 between said threaded ends and said turret heads. On the inner ends of said screw plugs 34 are diametrical bosses 37.

Cylinders 29 are suited to mount in the inner ends of holes 28 and $a^{28}$, in jaws 22 and 23 respectively, to bear against screw plugs 34, and the ends of said cylinders adjacent said screw plugs have diametrical slots 33 therein with any of which said bosses 37 on the inner ends of said screw plugs may engage. The construction is such that when one of screw plug heads 36 is revolved the cylinder 29 engaged therewith is revolved therewith. Mounted on a pin 31 in a diametrical hole 30 in the inner end of each of cylinders 29 is crowned roller 32 for revolution on said pin. Crotch $a^{29}$ is provided for said roller.

The position in rotation of screw plugs 34 in said jaws is maintained by setscrews 37, 37 engaged in jaws 22 and 23 respectively to bear in annular grooves 35 in said plugs.

In fastening my tooth roller to a saw grinding machine, as, for instance, like that shown in Figs. 3 and 10, care is taken to bring the contact of rollers 32 with the saw teeth above the bottom of the gullets, as shown in Fig. 10. Also, the plane of rollers 32 needs to be at an angle with the line of the tips of the saw teeth which is parallel with hinge bolt 24. As shown in Fig. 10, the dotted line u—u passes through the center of one of rollers 32 parallel with the sides thereof and it is, therefore, perpendicular to line t—t which coincides with the axis of pin 31 on which said roll revolves. In operating my roller I have found that if the plane of rolls 32 is parallel with a line through the points of the teeth B of the saw being rolled therewith said saw tends to rise between rolls 32 and prevent their proper action thereon, but when the plane of said rolls is inclined upward toward the approaching teeth from one to two degrees, the saw will remain in contact with the guide, on which the back thereof bears while passing through the grinder 12, the action of said rolls 32 aids in keeping the saw in place in the machine. Line u—u, as drawn in Fig. 10, is inclined upward toward the left about one degree and axial line t—t, as stated, is at right angles therewith. The position of line u—u is adjusted by revolving turret heads 36 which set rolls 32 as explained; and, also as explained, the desired position of said rolls is maintained by setscrews 37.

Although the axes of rolls 32, one of which is indicated at t—t in Fig. 10, are in the same plane perpendicular to the plane of saw A, I prefer that said axes be not parallel.

Fig. 2 shows my preferred relation of these axes as viewed longitudinally with saw A. In Fig. 2 s—s is a vertical line through the center of pivot 24, and p—o, r—o are lines tangent to the proximate surfaces of rolls 32 which intersect line s—s at o; and the lower ends of jaws 22 and 23 are sufficiently spread, as shown in Figs. 2 and 3, to cause tangent line p—o to be parallel with the axis of the roll with which it contacts, while tangent line r—o is parallel with the axis of the roll with which it contacts. Bent line m—n coincided with the axes of cylinders 29, its left-hand end is perpendicular to line p—o while its right-hand end is perpendicular to line r—o. Angle por is preferably about 4° which makes the bent line m—n inclined from its intersection with line s—s about 2° above the horizontal.

In Fig. 4 an enlarged cross section of saw A is shown. Beveled surfaces D, D are assumed to have been rolled on the edges of the gullet in my machine. Angle wxy is the angle of these surfaces when projected, and concave E is the shape of the cross section of the gullet caused by rolling bevels D on its edges. The greater the angle wxy the more complete will be the reformation of the serrated edges of the gullet left by the grinder and the more uniform the reformed mass at this place and the greater the freedom from fracture. Also the depth of the concave surface E will be greater when said angle wxy is enlarged and the surfaces D are extended. All of which tend toward the strengthening of the saw at these places and the stiffening of the base of teeth B.

In practice it has been found that angle wxy may be increased by increasing the curvature of the crown of the periphery of rolls 32 or by increasing angle por. When the curvature of the crown of the rolls is much greater than illustrated said rolls cut into the saw teeth B as they roll over the same in operation. This scoring of the teeth is undesirable for two reasons: the tooth-edge of the saw is "relieved" and these scores prevent the formation of a perfectly swaged point when the regrinding of the saw has brought the tooth ends to the line of said scores. For these reasons it has been found desirable to incline jaw 22 forward on the machine about 2° out of the vertical. This is done by using a part of the clearance afforded by slots 17. Then the lower end of jaw 23 is inclined outward about 2° and rolls 32 are caused to bear equally on both sides of saw A therebetween by adjusting the set of screw plugs 34. In adjusting the set of rollers 32 by revolving plugs 34, endwise adjustment and adjustment in rotation are made simultaneously. In order to disassociate these two movements, when desired, it is attained to a degree by withdrawing cylinders 29 and resetting them in another of grooves 33 in engagement with bosses 37. Also the exactness of angle por is not closely limited although the angle of inclination of line u—u with the horizontal is quite closely limited.

In these several easy ways the needed adjustments are attainable with my machine and an assembly clearly illustrated in Figs. 3 and 10 is reached, in which rolls 32 are proximate near their upper surfaces and said roll surfaces are inclined relative to the line of the points of the saw teeth, which holds said saw down on its guide and rolls beveled edges on the gullets substantially as illustrated in Figs. 4 and 11 at D, D.

Although the above description has, for convenience, assumed that in practice the gullets are rolled simultaneously with the sharpening of the saw, however, I generally prefer to perform these as two separate operations and roll the saw after the grinding has been completed.

The grinder illustrated in Fig. 10 is for grinding right-hand saws, and my roller is fastened to the right-hand end thereof. For rolling left-hand saws my roller is provided with a left-hand bracket in place of 16, 18 and fastened on the left-hand end of a left-hand grinding machine where the saw passes through the roller from the right toward the left.

Therefore when rolling left-hand saw teeth the plane of rolls 32 is inclined upward at the right and the adjustment is made by revolving turret heads 36 the proper amount.

Having thus disclosed my invention, what I claim as new therein and desire to secure by Letters Patent is,—

1. In a band saw tooth roller in combination, two hinged jaws, resilient means to retain said jaws in manually and automatically adjustable proximity, a roll mounted for revolution in each of said jaws in opposite proximity, and means to adjust the plane of each of said rolls in relative angularity with the axis of said hinge of said jaws.

2. In a band saw tooth roller in combination, two hinged jaws, resilient means to retain said jaws in manually and automatically adjustable proximity, a roll mounted for revolution in each of said jaws in opposite proximity, and means to adjust the planes of said rolls in relative angularity.

3. In a band saw tooth roller in combination, two hinged jaws, resilient means to retain said jaws in operative proximity, a roll mounted for revolution in each of said jaws in opposite proximity adapted for the passage of a band saw therebetween, and means to fasten said jaws to the frame of a band saw tooth grinder adapted for both vertical and inclined adjustment of said jaws on said frame.

4. In a saw tooth roller the combination of two hinged jaws, and a roll mounted for revolution in each of said jaws in proximate opposition, with means to adjust the planes of said rolls in angular relation with the hinge of said jaws.

5. In a saw tooth roller the combination of two hinged jaws, and a roll mounted for revolution in each of said jaws in operative proximity and opposition, with means to adjust the axes of said rolls in angular relation.

6. In a saw tooth roller the combination of two hinged jaws, and a roll mounted for revolution in each of said jaws in operative proximate opposition, with means to adjust the planes of said rolls in relative angularity with the axis of said hinge, and means to adjust the axes of said rolls in angular relation.

7. In a saw tooth roller in combination, two hinged jaws, each having a bore therethrough at right angles with the axis of said hinge said bores in line in one position in oscillation of said jaws on said hinge and each having a threaded outer end, a roll housing mounted in each one of said bores for revolution and reciprocation therein, a roll mounted for revolution in each of said roll housings in operative proximate opposition in said jaws, a screw plug engaged in said threaded end of each of said bores adapted to bear on the said roll housing therein, and means to engage each of said screw plugs with the roll housing in said bore therewith for simultaneous movements in said bore.

8. In a saw tooth roller in combination, two hinged jaws, each having a bore therethrough at right angles with the axis of said hinge said bores in line in one position in oscillation of said jaws on said hinge and each of said bores having a threaded outer end, a roll housing mounted in each of said bores for revolution and reciprocation therein, a roll mounted for revolution in each of said roll housings in operative opposite proximity, a screw plug engaged in the said threaded end of each of said bores adapted to bear on said roll housing therein, means to engage each of said screw plugs with the roll housing in said bore therewith for simultaneous movements in said bore, and means to fasten said screw plugs in desired positions in rotation.

ALBERT E. PROCTOR.